Patented Dec. 1, 1931

1,834,686

UNITED STATES PATENT OFFICE

ALEX BROOKING DAVIS, OF CINCINNATI, OHIO, ASSIGNOR TO A. B. DICK COMPANY, OF CHICAGO, ILLINOIS, A CORPORATION OF ILLINOIS

COMPOUND ESTERS OF HYDROXY AROMATIC ACIDS

No Drawing.   Application filed February 5, 1926. Serial No. 86,343.

Carbohydrate esters used in various industrial compounds are in many instances applied in the form of solutions and often compounded with other substances which vary the properties thereof by softening, distending or toughening the resulting films or coatings. The modifying effects obtained upon carbohydrate esters by various other modifying and distending agents which may be incorporated with them in solution vary greatly, some of the modifying agents leaving films soft but with tack, while others may leave the film equally soft but with no tack, and the film may be oily in character. Still others, without affecting the tack or other general properties, seem primarily to add toughness and to increase the homogeneity of the film or coating.

The properties of the various modifying and distending agents used with carbohydrate esters particularly affect the qualities of certain types of coatings, and one of the most sensitive types in this respect are the homogeneous films which may be deposited by means of carbohydrate ester solutions upon porous base sheets, such as Japanese yoshino, for the production of type and stylus impressible stencil sheets.

Among the carbohydrate esters which are highly useful for many purposes is cellulose acetate of various types, some of which are acetone soluble and others insoluble in acetone. A more rare carbohydrate ester which forms homogeneous films suitable for certain industrial purposes is tragacanth acetate, made by the acetylation of tragacanth gum.

Of the known modifying, softening and distending agents for these substances, dibutyl tartrate and diamyl phthalate are two which may be used to advantage, but when it is desired to obtain certain effects, neither of these two modifiers nor any other hitherto known modifiers, in my experience, give the effects most desirable; and the object of this invention is to provide a new group of agents having improved modifying and distending properties for carbohydrate esters in the production of type and stylus impressible stencil sheets.

In accordance with this invention, these new agents include aliphatic and aromatic esters which normally possess one or more free hydroxyl groups, the hydrogen atom of which has been replaced by an acid group such as would be obtained by reacting upon a hydroxyl bearing ester with an organic acid. Thus, dibutyl tartrate possesses two free hydroxyl groups in the tartaric acid radical, but when one or both of these are combined with an acid group, the properties of the dibutyl tartrate are so far altered as to greatly change certain of its normal effects when it is used as a modifying and distending agent in such carbohydrate esters as cellulose acetate. Such a compound is readily made by reacting upon one mol of dibutyl tartrate with one mol of benzoyl chloride, when there is formed mono benzoyl butyl tartrate of the following structure:

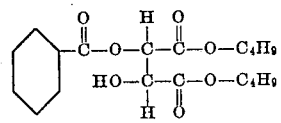

A similar product is also obtained by reacting upon dibutyl tartrate with acetyl chloride, when mono acetyl butyl tartrate is obtained, and the resulting product has properties similar to those of the mono benzoyl compound cited above.

While, for the purpose of this invention, I have found the acid substituted derivatives of dibutyl tartrate of particular advantage, I know that a large number of other compounds consisting of the acid substituted hydroxy acid esters are applicable for the same purpose; thus amyl salicylate when reacted upon with benzoyl chloride yields benzoyl amyl salicylate, and ethyl citrate combined with benzoyl chloride gives benzoyl ethyl citrate; and any one of these latter compounds possesses properties of the character which I regard as within the scope of this invention, which consists of modifying agents for carbohydrate esters derived from hydroxy acid esters by substituting the hydrogen of the hydroxyl with an acid group.

The value of the invention is obvious when it is considered that extensive experimental work shows the properties of carbohydrate ester (particularly cellulose acetate) films containing such substances as mono benzoyl butyl tartrate to be very different from the properties obtained by distending or modifying cellulose acetate films with substances of any other type. Thus, a coating for stencil sheets properly compounded with mono benzoyl butyl tartrate will yield stencils which are capable of being stencilized not only by means of the typewriter but also with a stylus, while results of inferior quality are obtained in the production of such stencils without the presence of the acid substituted hydroxy acid esters.

In carrying out my invention in general, it is only required that one mol of a hydroxy acid ester be heated to the temperature of reaction with one mol of an acid chloride for each hydroxyl group present. For the production of mono benzoyl butyl tartrate, there is mixed together 460 grams of dibutyl tartrate and 246 grams of benzoyl chloride in an apparatus equipped with a reflux condenser, and the mixture is heated until all hydrochloric acid gas evolved in the action has been eliminated, and the reaction product is shown to be neutral to Congo paper. The reaction takes place nicely at 60 to 80 degrees centigrade, and higher temperatures may bring about some discoloration and decomposition. Upon the completion of the reaction, the resulting heavy oil is found to be free from the odor of benzoyl chloride, and the resulting compound when suitably modified possessing many properties desirable for the production of homogeneous films in industrial work.

I do not restrict myself to the kind of hydroxy acid used in the formation of the ester, or of the alcohol with which it may be combined, or to the nature of the acid group used to substitute the hydrogen of the hydroxyl, since any combination of the three primary groups may yield a compound possessing the desired properties and falling within the scope of this invention.

I do not restrict myself to the number of hydroxyl groups which may thus be covered by acid groups in the production of this group of modifying agents.

Now having described my invention, what I claim is:—

1. A modifying and distending agent for carbohydrate esters, comprising the acid substituted mono-benzoyl derivative of tartaric acid esters.

2. As a new article of manufacture, mono benzoyl butyl tartrate.

3. As new products, compounds of esters of hydroxy acids having more than one carboxyl group wherein a hydrogen atom of a hydroxyl group is replaced by a benzoyl group.

This specification signed this 28th day of January, 1926.

ALEX BROOKING DAVIS.